United States Patent [19]

Plagge et al.

[11] Patent Number: 5,101,334
[45] Date of Patent: * Mar. 31, 1992

[54] HIGH SPEED POWER SUPPLY CIRCUIT WITH CIRCUIT WITH POSITIVE FEEDBACK

[75] Inventors: Joseph A. M. Plagge, Nijmegen; Johannes E. Algra, Drachten, both of Netherlands

[73] Assignee: U.S. Philips Corporation, New York, N.Y.

[*] Notice: The portion of the term of this patent subsequent to Jul. 3, 2007 has been disclaimed.

[21] Appl. No.: 515,998

[22] Filed: May 21, 1990

Related U.S. Application Data

[63] Continuation of Ser. No. 404,931, Sep. 7, 1989, Pat. No. 4,939,632.

[30] Foreign Application Priority Data

Feb. 14, 1989 [NL] Netherlands ............... 8900359

[51] Int. Cl.⁵ ......................................... H02M 3/335
[52] U.S. Cl. ....................................... 363/19; 363/21; 363/97
[58] Field of Search ................ 363/18, 19, 20, 21, 363/97, 131

[56] References Cited

U.S. PATENT DOCUMENTS

| | | | |
|---|---|---|---|
| 4,187,536 | 2/1980 | Govaert et al. | 363/97 |
| 4,263,643 | 4/1981 | Koike | 363/19 |
| 4,415,960 | 11/1983 | Clark | 363/21 |
| 4,504,775 | 3/1985 | Becker | 363/19 |
| 4,523,139 | 6/1985 | Schwarz et al. | 363/21 |
| 4,546,421 | 10/1985 | Bello et al. | 363/97 |
| 4,551,666 | 11/1985 | Wada et al. | 320/20 |
| 4,607,319 | 8/1986 | Assow et al. | 363/20 |
| 4,628,429 | 12/1986 | Walker | 363/21 |
| 4,652,984 | 3/1987 | van der Akker et al. | 363/18 |
| 4,684,871 | 8/1987 | Plagge | 363/19 |
| 4,731,719 | 3/1988 | Nelson | 363/20 |
| 4,763,061 | 8/1988 | Schwarz | 363/19 |
| 4,939,632 | 7/1990 | Plagge et al. | 363/97 |

Primary Examiner—R. Skudy
Assistant Examiner—Jeffrey L. Sterrett
Attorney, Agent, or Firm—Bernard Franzblau

[57] ABSTRACT

A self-oscillating power supply circuit comprises a series arrangement of the primary winding ($N_1$) of a transformer (TR), the main current path of a first semiconductor switch ($T_1$) and a current measuring resistor ($R_1$). The first semiconductor switch is driven by a second semiconductor switch ($T_2$) which in turn is controlled by a comparator (CP). The voltage across the current measuring resistor is applied to the non-inverting input (6) of the comparator and, a reference voltage obtained from a reference voltage source (RS) is applied to the comparator inverting input (5). By arranging a capacitor ($C_2$) between the output of the second semiconductor switch and the inverting input (5) of the comparator, the first semiconductor switch rapidly turns-off at the end of the forward phase at an accurately determined current through the primary winding. By applying a lower reference voltage to the comparator at a higher mains voltage, an output current is obtained from the transformer secondary winding ($N_2$) for the load L, which is substantially independent of the mains voltage.

2 Claims, 4 Drawing Sheets

HIGH SPEED POWER SUPPLY CIRCUIT WITH CIRCUIT WITH POSITIVE FEEDBACK

This is a continuation of application Ser. No. 07/404,931 filed Sept. 7, 1989 and now U.S. Pat. No. 4,939,632.

BACKGROUND OF THE INVENTION

The invention relates to a power supply circuit for supplying a load from input voltages of different magnitude, comprising a first series arrangement formed by a primary winding of a transformer and a main current path of a first semiconductor switch; a second series arrangement formed by a secondary winding of the transformer and a rectifier diode, this second series arrangement having terminals for connecting the load; a second semiconductor switch for switching the first semiconductor switch; and means for generating a signal which is a measure of the current through the primary winding.

Such a circuit can, for example, be used for charging a rechargeable battery or for supplying an electronic apparatus, it being possible to connect the apparatus without switching to voltage sources of different magnitude, for example to the electric power mains in different countries. Such a power supply circuit can more specifically be used in a rechargeable electric shaver in which the circuit produces the current for charging the battery or for supplying the motor.

A power supply circuit of the type referred in the opening paragraph is disclosed in EP-B1-0030026. This European Patent describes a power supply circuit in which, during the, so called, forward phase, a current which flows flowing through the primary winding increases linearly with time. This current causes energy to be stored in the transformer. In the emitter line of a first transistor which constitutes the first semiconductor switch, a resistor is included across which a voltage is produced which is proportional to the primary current. The base-emitter junction of a second transistor is arranged in parallel with this resistor. This transistor constitutes the second semiconductor switch. The resistor constitutes said means for generating the signal which is a measure of the primary current. At a given value of the primary current the second transistor becomes conductive and consequently the first transistor is rendered non-conducting. This terminates the forward phase and the, so called, flyback phase starts. Because of the energy stored in the transformer a secondary current flows in the secondary winding during the flyback phase. This current forms the charging current for the batteries or directly provide the supply current for the relevant apparatus. The secondary current decreases linearly with time. At the end of the flyback phase the first transistor is turned-on again, and another forward phase begins.

In the prior art supply circuit a signal which linearly increases with time is applied during the forward phase to the control input of the second semiconductor switch. Due to this signal, the second semiconductor switch is driven relatively slowly into the conducting state. This implies that the instant at which the second semiconductor switch becomes conductive and consequently the first semiconductor switch is rendered non-conducting is not accurately defined, so that the turn-off value of the primary current is not accurately defined.

SUMMARY OF THE INVENTION

The invention has for its object to provide a power supply circuit in which the second semiconductor switch is turned-on rapidly.

Therefore, according to the invention, the power supply circuit is characterized in that an output of said means for generating a signal which is a measure of the current through the primary winding is connected to a first non-inverting input of a comparator, a second inverting input of which is connected to an output of means for fixing a reference voltage and an output of which is connected to a control input of the second semiconductor switch, and the inverting input of the comparator is coupled via a capacitor to an output of the second semiconductor switch.

Not until the signal which is a measure of the primary current has reached a level determined by the reference voltage will the comparator supply a control signal by means of which the second semiconductor switch is turned-on and consequently the first semiconductor switch is rendered non-conductive conductive. Consequently, no signal is applied to the control input before the primary current has reached said level. Because a positive feedback circuit is established between the output of the second semiconductor switch and its control input, via the capacitor and the comparator, the second semiconductor switch becomes rapidly conductive and consequently the first semiconductor switch is rapidly rendered non-conducting. The turn-off value of the primary current is accurately determined thereby.

A fast turn-off of the first semiconductor switch has the advantage that this reduces the dissipation of energy in this switch to a considerable extent. Particularly for a compact apparatus, such as, for example, a shaver, this is a considerable advantage as it reduces the necessity of providing cooling means.

An embodiment of the power supply circuit according to the invention, in which the first and second semiconductor switches are constituted by first and second transistors, is characterized in that the comparator is formed by a third transistor of a conductivity type opposite to that of the first and second transistors and whose base constitutes the inverting input and the emitter the non-inverting input and the collector constitutes the output. Such a transistor is suitable for use as a comparator and is cheap.

Preferably, the power supply circuit according to the invention is characterized in that the means for fixing a reference voltage have has a control input for receiving a signal which is a measure of the input voltage and that these means are arranged for supplying a reference voltage which is lower as the input voltage is higher. Since the reference voltage supplied depends in the manner described on the input voltage of the power supply circuit, the average intensity of the output current is kept constant within given tolerances at an appropriate choice of this voltage dependence.

A further embodiment of the power supply circuit according to the invention is characterized in that the means for fixing a reference voltage are constituted by a circuit formed by a fourth transistor whose base-emitter junction is arranged in parallel with a first resistor, whose base-collector junction is arranged in parallel with a second resistor, the junction point of the collector of the fourth transistor with the second resistor constituting an output of the means for fixing a reference voltage, and the junction point between the base of the fourth transistor and the first and second resistors constituting a control input for receiving a control signal. The magnitude of the reference voltage thus generated is provided by the magnitude of the control voltage applied to the base of the fourth transistor. It should be noted that in EP-A-0188839 a power supply circuit is disclosed of this type in which the control input of the second semiconductor switch is coupled to means for generating a signal which is a measure of the current through the primary winding via what is commonly denoted as a $V_{BE}$-multiplier. However, in this known circuit the second semiconductor switch is driven only slowly into the conductive state, so that in this circuit too the turn-off value of the primary current is not accurately determined.

Another further embodiment of the power supply circuit according to the invention is characterized in that the means for fixing a reference voltage comprise a current mirror circuit having a primary and a secondary branch, the current-mirror circuit being arranged such that the current flowing through each of the two branches is substantially proportional to the input voltage. By feeding the secondary branch from a constant supply voltage and by incorporating in the secondary branch a resistor across which a voltage is generated which is proportional to the input voltage, the reference voltage source produces a reference voltage which decreases linearly with an increasing input voltage.

The power supply circuit according to the invention is preferably characterized in that the second series arrangement of the secondary winding and the rectifier diode provided with terminals for connection of the load is arranged in series with the main current path of the first semiconductor switch. In this preferred embodiment the load, which is arranged in parallel with the secondary winding, is not only supplied from the transformer during the flyback phase, but also directly during the forward phase by the primary current from the applied input voltage. The power supply circuit according to the invention may be further characterized in that the means for generating a signal which is a measure of the current through the primary winding is arranged between the first semiconductor switch and the second series arrangement. In this situation the termination of the forward phase also depends on the storage battery voltage, so that the charging current of the storage battery decreases at higher battery voltage levels.

A power supply circuit according to the invention is eminently suitable for integration, at least partly, in an integrated circuit. An integrated circuit for use in a power supply circuit according to the invention preferably comprises the second semiconductor switch, the comparator and the reference voltage source.

BRIEF DESCRIPTION OF THE DRAWING

The invention will now be described, by way of example, in greater detail with reference to the accompanying drawing, in which.

DESCRIPTION OF THE PREFERRED EMBODIMENTS

Figure 1:
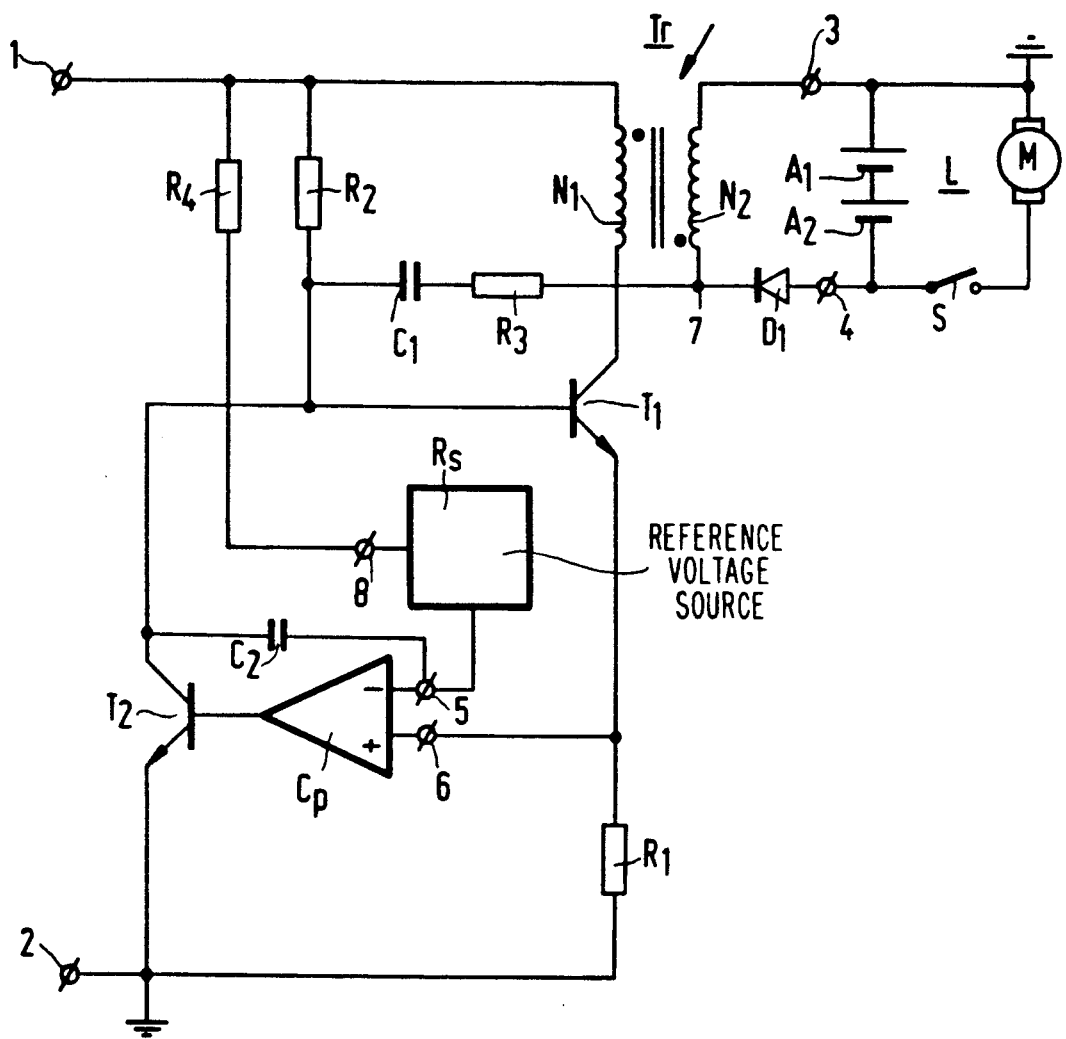
FIG. 1 is a first circuit diagram of the power supply circuit according to the invention.

FIG. 1 shows the circuit diagram of a self-oscillating power supply circuit according to the invention.

The primary winding $N_1$ of a transformer TR, the main current path of a first transistor $T_1$ and a current measuring resistor $R_1$ are arranged in series between the positive input terminal 1 and the negative input terminal 2. This this transistor $T_1$ constitutes the first semiconductor switch. The base of the first transistor is coupled to the negative input terminal 2 via the main current path of the second transistor $T_2$ which constitutes the second semiconductor switch. The base of the second transistor $T_2$ is connected to the output of a comparator CP which has an inverting input 5 connected to the output of the means for fixing a reference voltage, for example, a reference voltage source RS a second, non-inverting, input 6 is connected to that terminal of the current measuring resistor $R_1$ that is closer to the first transistor. The base of the first transistor $T_1$ is further coupled to the positive input terminal 1 via a starter resistor $R_2$. The secondary winding $N_2$ of the transformer TR is arranged in series with a rectifier diode $D_1$ between two terminals 3 and 4. A load L which, for example, a series arrangement of two rechargeable batteries $A_1$ and $A_2$, with which a motor M can be arranged in parallel via a switch S, is connected to the two terminals 3 and 4. The junction point 7 of the secondary winding $N_2$ and the rectifier diode $D_1$ is coupled to the base of the first transistor $T_1$ via a positive feedback circuit formed by a series arrangement of a resistor $R_3$ and a capacitor $C_1$. The collector of the second transistor $T_2$, and consequently the base of the first transistor $T_1$, is coupled via the capacitor $C_2$ to the inverting input 5 of the comparator CP. Finally, an input 8 of the reference voltage source is connected to the positive input terminal 1 via the resistor $R_4$.

At for a constant value of the input voltage the circuit operates as follows. After the application of an input voltage, a d.c. voltage or a rectified a.c. voltage, to the input terminals 1 and 2 a small current starts flowing through the starter resistor $R_2$ into the base of the first transistor $T_1$. This transistor is partly rendered conductive thereby, so that a small primary current starts flowing through the primary winding $N_1$ of the transformer TR. This primary current induces a voltage across the secondary winding $N_2$, which induced voltage generates a current in the positive feedback circuit formed by the resistor $R_3$ and the capacitor $C_1$, this current is fed to the base of the transistor $T_1$ causing this transistor to become conductive to an increased extent. Via the positive feedback circuit the first transistor is thus driven rapidly to the fully conductive state, whereafter a primary current which linearly increases with time flows through the primary winding $N_1$. Together with the primary current a voltage, which also increases linearly with time, is produced across the current measuring resistor $R_1$. This voltage, is applied to the non-inverting input 6 of the comparator CP. A reference voltage which is obtained from the reference voltage source RS, is applied to the inverting input 5 of the comparator. As soon as the voltage across the current measuring resistor $R_1$ reaches a level determined by the reference voltage, the comparator changes state and a signal becomes available at the output of the comparator CP in response to which the second transistor $T_2$ is rendered conductive. This causes the voltage at the base of the first transistor $T_1$ to be decreased, so that this transistor is cut-off and the primary current stops flowing. This phase of a cycle is called the forward phase.

Since the collector of the second transistor $T_2$ is coupled via the capacitor $C_2$ to the inverting input of the comparator, the voltage drop across this collector is conveyed to the input of the comparator. This causes the voltage difference between the two inputs of the comparator to increase and consequently the control current for the base of the second transistor $T_2$ supplied by the comparator. As a result thereof the second transistor becomes increasingly conductive which causes the voltage at its collector to decrease still further. Consequently, because of the positive feedback due to the capacitor $C_2$, the second transistor $T_2$ is very rapidly rendered conductive, as a result of which the first transistor $T_1$ is also driven very rapidly out of its conducting state. The value of the primary current at which the forward phase is terminated is consequently determined very accurately.

During the forward phase the rectifier diode $D_1$ is in the non-conducting state. After the primary current has ended, the polarity of the voltage across the secondary winding $N_2$ changes so that the rectifier diode becomes conductive. The energy stored in the transformer is thereafter transferred in the form of a current to the load L, for example for charging the batteries $A_1$ and $A_2$. During this phase, denoted the flyback phase, the current decreases linearly to zero, whereafter the transistor $T_1$ is switched on again via the positive feedback circuit formed by $R_3$ and $C_1$ and a subsequent forward phase starts.

At a different, higher value of the input voltage the primary current increases during the forward phase to a different, faster, extent. Since the average output current at a fixed load is determined by the period of the cycle and the energy level of the transformer, the average output current through the load increases, for a high input voltage because of the increasing frequency. This effect, an input voltage-dependent output current, is not wanted. To suppress this voltage dependence a voltage which is proportional to the input voltage is applied to the input 8 of the reference voltage source via a resistor $R_4$. The reference voltage source RS is arranged such that the reference voltage supplied is lower as the voltage at the input 8 is higher. In response to the lower reference voltage the primary current reaches the level at which the first transistor $T_1$ is turned-off via the second transistor $T_2$ at an earlier instant. Consequently, the forward phase is shortened so that the average output current remains the same in spite of the higher input voltage across the terminals 1 and 2.

It should be noted that the signal applied to the reference voltage source, which is a measure of the magnitude of the input voltage, can be obtained in a different manner, for example from the junction point 7 of the secondary winding $N_2$ and the rectifier diode $D_1$, or can be generated with the aid of additional elements, for example an auxiliary coil. During the forward phase the voltage at the point 7 is proportional to the input voltage via the turns ratio.

Figure 2:
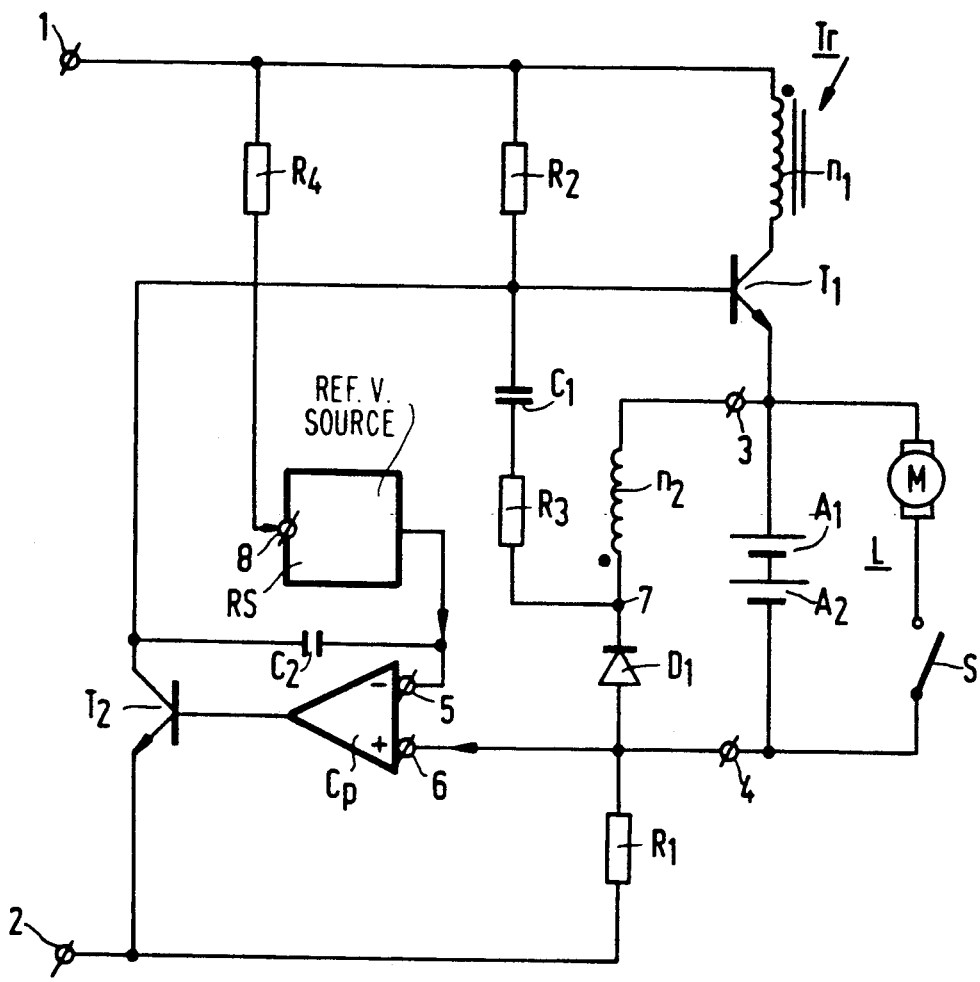
FIG. 2 is a second circuit diagram, of the invention in which the load is arranged in series with the main current path of the first semiconductor switch.

FIG. 2 is a second circuit diagram of the power supply circuit according to the invention, in which however the load L is arranged in series with the main current path of the first semiconductor switch $T_1$. This circuit diagram comprises the same elements as the circuit diagram of FIG. 1. These elements are given the same reference numerals.

The mode of operation of this circuit is substantially the same as the mode of operation of the circuit described in the foregoing. After the first transistor $T_1$ has been rendered conductive via the starter resistor $R_2$ and the positive feedback circuit formed by the resistor $R_3$ and the capacitor $C_1$, the primary current, whose intensity increases linearly, does not only flow through the primary winding $N_1$ of the transformer TR, the main current path of the transistor $T_1$ and the current measuring resistor $R_1$, but also through the load L. The load is consequently also fed during the forward phase. In all other aspects the operation of the circuit described in the foregoing is identical to that of the circuit of FIG. 1 and will therefore not be described in greater detail.

Figure 3:
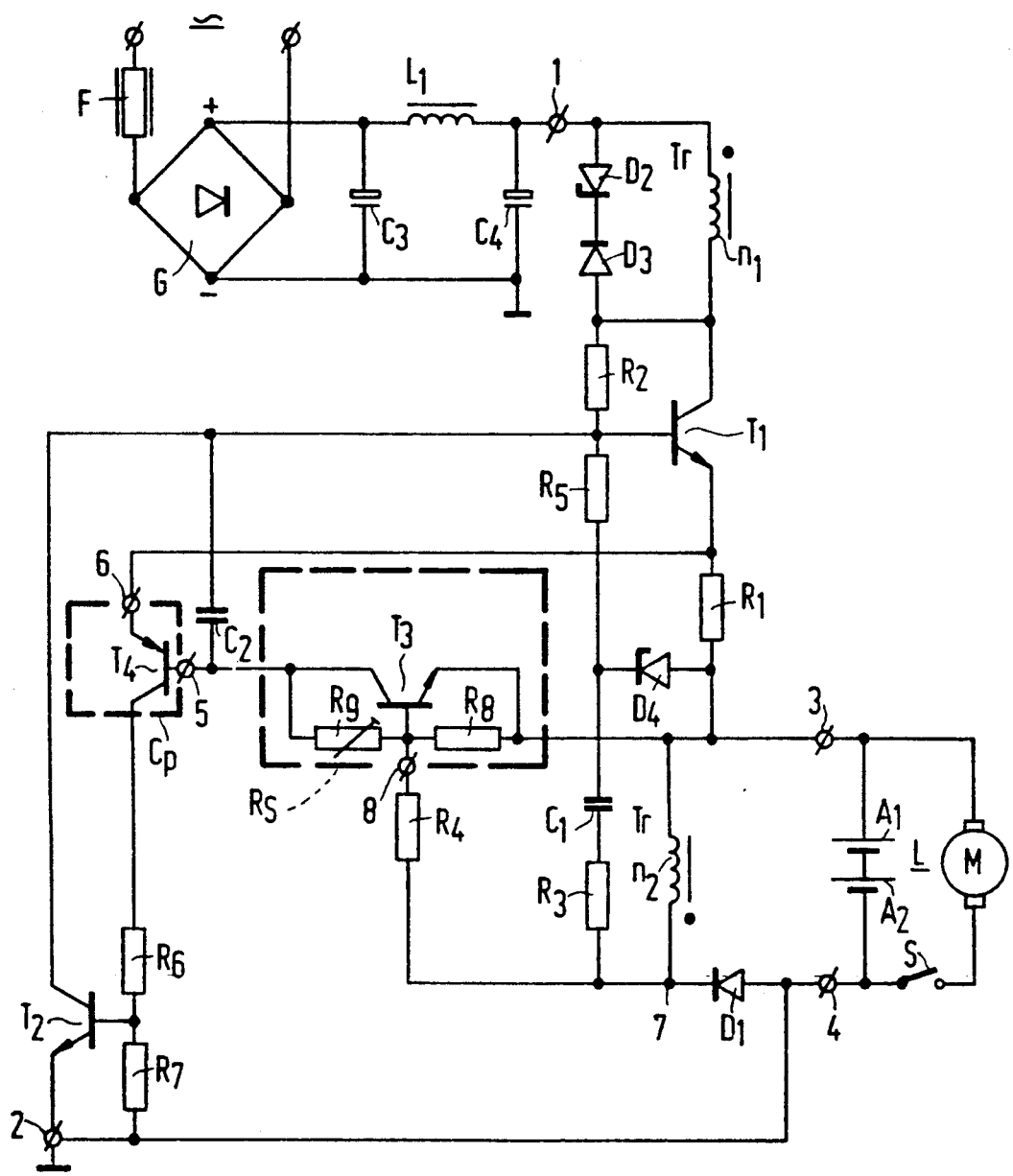
FIG. 3 shows a first embodiment of a power supply circuit according to the invention.

FIG. 3 shows an embodiment of a circuit according to the invention. In this circuit the elements corresponding to the preceding circuit diagrams are given the same reference numerals.

The power supply circuit is connected to the AC supply voltage via the rectifier bridge G and the smoothing filter comprising the coil $L_1$ and the capacitors $C_3$ and $C_4$. One of the input lines of the rectifier bridge G incorporates the resistor F which acts as a fuse and limits and interrupts the switch-on and transient currents in the case of excessive mains currents.

Similar to what has been described in the foregoing, this embodiment is based on a first series arrangement of the primary winding $N_1$ of the transformer TR, the first semiconductor switch $T_1$ and the current measuring resistor $R_1$ and a second series arrangement of the secondary winding $N_2$ of the transformer and the rectifier diode $D_1$ which is arranged in parallel with the load L. The load L is arranged in series with the first series arrangement between the current measuring resistor and the negative input terminal 2 of the power supply circuit. A snubber circuit formed by the Zener diode $D_2$ and diode $D_3$ is arranged parallel to the primary winding $N_1$ to suppress voltage peaks on switch-off of the current through the primary winding of the transformer. The starter resistor $R_2$ is not directly connected to the positive input terminal but is arranged in parallel with the collector-base junction of the first transistor $T_1$ which constitutes the first semiconductor switch.

In contradistinction to the preceding circuit diagrams, the positive feedback circuit between the junction point 7 of the secondary winding $N_2$ with the rectifies diode $D_1$ and the base of the transistor $T_1$ is assembled from a series arrangement of two resistors $R_3$ and $R_5$ with an interposed capacitor $C_1$. A Zener diode $D_4$ whose anode faces the emitter of the transistor is provided between the junction point of the resistor $R_5$ with the capacitor $C_1$ and via resistor $R_1$ the emitter of the first transistor $T_1$. The Zener diode $D_4$ limits the maximum voltage which can be applied to the base of the first transistor $T_1$. As a result thereof the transistor $T_1$ cannot be saturated too much so that the delay which occurs at the turn-off of the first transistor $T_1$ after the second transistor $T_2$ has been rendered conductive is limited. The effect of the Zener diode $D_4$ is independent of the input voltage.

The second semiconductor switch, transistor $T_2$, which switches the first transistor $T_1$, is driven from the comparator CP. This comparator is constituted by the PNP-transistor $T_4$ whose emitter is the non-inverting input 6 and whose base is the inverting input 5. At the beginning of the forward phase the PNP-transistor $T_4$ is non-conducting. During the forward phase the voltage at the non-inverting input 6, the emitter of the transistor, increases linearly until the difference between this voltage and the voltage, determined by the reference voltage source, at the inverting input 5, the base of the transistor, has become that large enough that the PNP-transistor $T_4$ starts conducting a signal, which is applied to the base of the second transistor $T_2$, then becomes available a at the collector of the PNP-transistor, the output of the comparator. Because of the non-linear characteristic of the PNP-transistor $T_4$ the signal applied to the base of the transistor $T_2$ increases rapidly. This causes this transistor to become conductive as a result of which the first transistor $T_1$ is cut-off and the forward phase is terminated.

A second capacitor $C_2$ is provided between the base of the PNP-transistor $T_4$ and the base of the first transistor $T_1$.

When, the PNP-transistor $T_4$ has become slightly conductive and the second transistor $T_2$ also is rendered conductive to some extent, the voltage at the collector of the second transistor decreases. This decrease in voltage is conveyed to the base of the PNP-transistor $T_4$ via the capacitor $C_2$. As a result thereof the base-emitter voltage of $T_4$ increases, so that this PNP-transistor is rendered conductive to a greater extent. In its turn the transistor $T_4$ now renders the second transistor $T_2$ more conductive. Thus the second transistor $T_2$ is rapidly rendered conductive, causing the first transistor $T_1$ to be rapidly cut-off.

The means $R_s$ for fixing a reference voltage includes a transistor $T_3$. A first resistor $R_8$ is arranged parallel to the base-emitter junction of this transistor and a second resistor $R_9$ is arranged parallel to the base-collector junction. The emitter of the transistor $T_3$ is connected to that end of the resistor $R_1$ that is remote from the first transistor $T_4$. The output of $R_s$ is constituted by the junction point of the collector of the transistor $T_3$ and the second resistor $R_9$. This junction point is connected to the base of the PNP-transistor $T_4$.

The means $R_s$ operate as follows. During the beginning of the forward phase the transistor $T_3$ is non-conducting. The output is connected to a voltage which is equal to the voltage across that end of the current measuring resistor $R_1$ that faces the first transistor, which voltage has been transferred via the comparator. Consequently, a voltage equal to the voltage across the resistor $R_1$ is present across the means $R_s$. When the primary current increases, the voltage across the first resistor $R_8$ will increase proportionally thereto and consequently also the base-emitter voltage of the transistor $T_3$ until the transistor $T_3$ starts conducting. A further increase of the voltage across the resistor $R_1$ is then accompanied by an increasing current through the transistor $T_3$, the voltage remaining the same. The voltage at the input of the comparator consequently does not increase any further, so that a constant reference voltage is obtained during the remaining portion of the forward phase. The forward phase is ended as soon as the voltage difference between the inputs 5 and 6 of the comparator has increased to such a high value that the PNP-transistor $T_4$ starts conducting. The primary current then stops. The voltage across the resistor $R_1$ disappears, in response to which the voltage across the means $R_s$ and across the resistor $R_1$ decreases to zero. The transistor $T_3$ then changes again to the cut-off state.

The above description is based on the situation in which there is a connection between the junction point of the base of the transistor $T_4$ $T_3$ and the first and second resistors $R_8$ and $R_9$ and an external voltage source. However, in the presence of an external voltage source applying a voltage to this junction point, a bias voltage will be applied across the first resistor $R_8$, and consequently across the base-emitter junction of $T_3$, which causes the transistor $T_3$ to start conducting at a lower voltage across the current measuring resistor $R_1$. The maximum voltage at the output of the means $R_s$ is consequently also lower and the forward phase is terminated at a lower value of the primary current.

In the embodiment shown in FIG. 3 the external voltage is supplied by the secondary winding $N_2$ of the transformer. Via the turns ratio this secondary voltage is proportional to the input voltage connected to the power supply circuit so that the external voltage applied to the reference voltage source is higher as the input voltage increases. The bias voltage across the resistor $R_8$ is determined by the voltage divider formed by the first resistor $R_8$ and the current-limiting resistor $R_4$.

Figure 4:
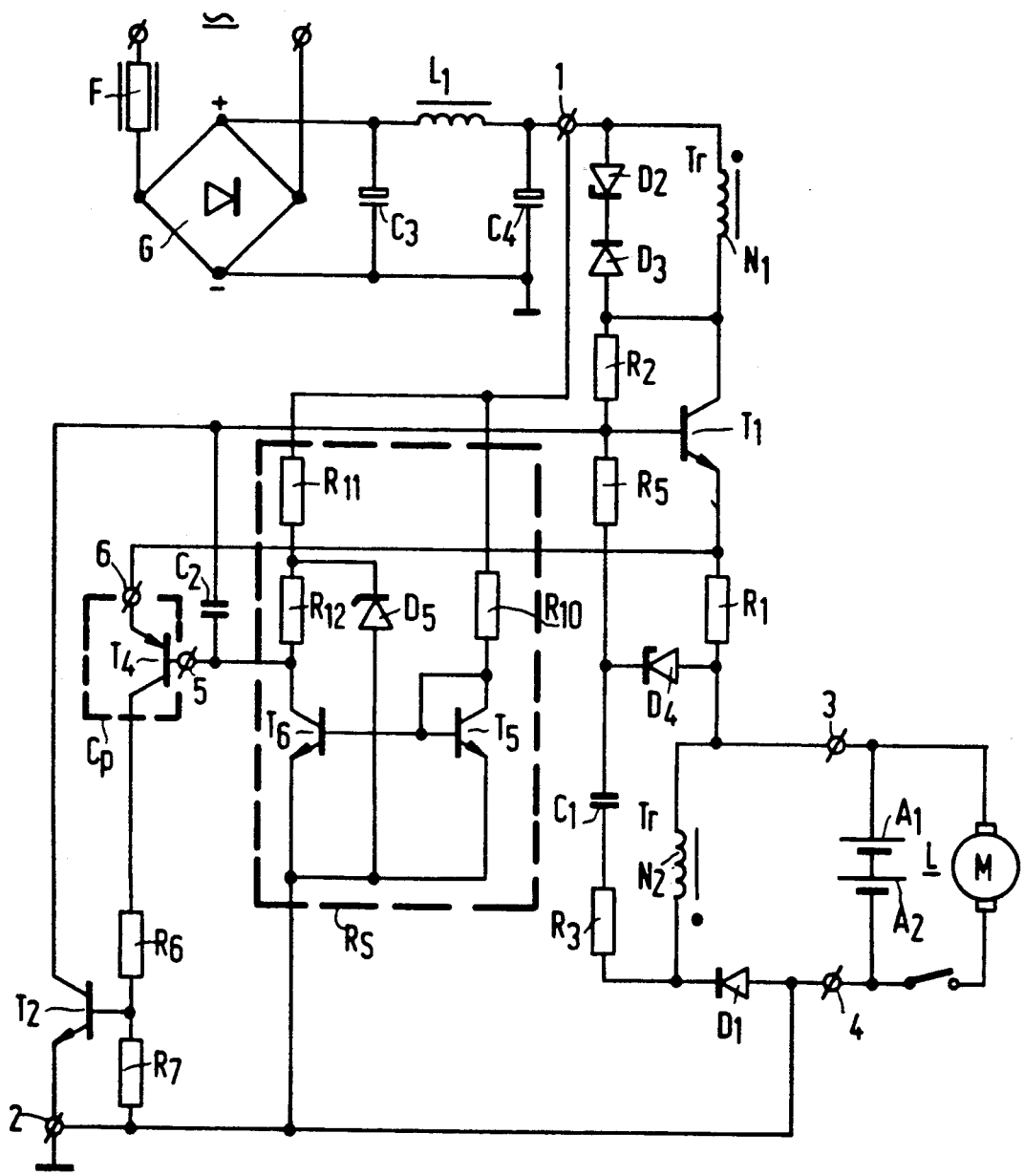
FIG. 4 shows a second embodiment of a power supply circuit according to the invention.

FIG. 4 shows a second embodiment of a power supply circuit according to the invention. In this circuit the reference voltage source is constituted by a current mirror circuit. In all further respects the circuit is similar to the circuit described in the foregoing, the elements have given the same reference numerals and will not be described in greater detail here.

In this embodiment the means for fixing a reference voltage are constituted by a reference voltage source RS which is assembled from two series arrangements coupled between the two input terminals 1 and 2 of the power supply circuit. One series arrangement is formed by a resistor $R_{10}$ in series with the collector-emitter path of a fifth transistor $T_5$. The base and the collector of the transistor $T_5$ are interconnected so that the transistor is arranged as a diode. The second series arrangement comprises two resistors $R_{11}$ and $R_{12}$ arranged in series with the collector-emitter path of a sixth transistor $T_6$. A Zener diode $D_5$, whose anode is connected to the junction point of the two resistors $R_{11}$ and $R_{12}$ and whose cathode is connected to the emitter of transistor $T_6$, is arranged in parallel with the resistor $R_{12}$ and the main current path of transistor $T_6$. The base of transistor $T_6$ is connected to the base of transistor $T_5$.

When a voltage is applied across the input terminals 1 and 2 a current starts flowing through the primary branch, formed by the resistor $R_{10}$ and the transistor $T_5$. A base-emitter voltage $V_{BE}$ will then be produced across the base-emitter junction of the fifth transistor $T_5$, in correspondence with the current intensity. Consequently the same base-emitter voltage $V_{BE}$ is present across the base-emitter junction of the sixth transistor $T_6$ so that, in this secondary branch of the current mirror a current will flow of the same intensity as that in the primary branch. Because of the Zener diode $D_5$ the junction point of the two resistors $R_{11}$ and $R_{12}$ carries a constant voltage equal to the break-down voltage of the Zener diode. The voltage at the junction point of the resistor $R_{12}$ with the collector of the sixth transistor $T_6$ is consequently equal to the difference between the Zener voltage and the voltage across the resistor $R_{12}$. In view of the action of the current mirror this voltage is equal to the product of the resistance value of $R_{12}$ and the current through the primary branch of the current mirror. Since the current through the primary branch is proportional to the input voltage across the terminals 1 and 2 the voltage at the collector of the sixth transistor $T_6$ is lower as the value of input voltage is higher. The voltage at the collector of the transistor $T_6$ is applied as a reference voltage to the inverting input 5 of the comparator CP.

Finally, it should be noted that the means for fixing a reference voltage, as described in the foregoing and shown in the Figures, has an output voltage which linearly depends on the input voltage of the power supply circuit. It is of course possible to use means which have a non-linear dependence. In that situation it is possible to adapt the input voltage-output current characteristic to a desired behaviour. Moreover, the invention is not limited to a specific comparator. In addition to the comparator described, different comparators known to skilled in the art can alternatively be used, for example, a push-pull amplifier.

We claim:

1. A power supply circuit for supplying a load from input voltages of different magnitude, comprising: a pair of input terminals for connection to a source of unidirectional input voltage, means connecting a first series arrangement including a primary winding of a transformer and a first semiconductor switch to said input terminals, a second series arrangement including a secondary winding of the transformer and a rectifier diode, said second series arrangement having terminals for connection to the load, a second semiconductor switch coupled to a control electrode of the first semiconductor switch for switching the first semiconductor switch off a comparator having a first input connected to a source of reference voltage, a second input and an output coupled to a control input of the second semiconductor switch, means for supplying to said second input of the comparator a signal proportional to the current in said primary winding, and a positive feedback circuit coupling an output terminal of the second semiconductor switch to said first input of the comparator.

2. A power supply circuit as claimed in claim 1, wherein said positive feedback circuit comprises a capacitor, and said source of reference voltage includes a control input for receiving a signal proportional to the input voltage and means responsive thereto for supplying to said first input of the comparator a reference voltage which varies inversely with the input voltage.

* * * * *